United States Patent
Lim et al.

(10) Patent No.: US 9,655,106 B2
(45) Date of Patent: May 16, 2017

(54) NON-ORTHOGONAL CONNECTION ID-BASED SCHEDULING METHOD AND APPARATUS FOR USE IN DEVICE TO-DEVICE COMMUNICATION SYSTEM

(71) Applicant: Samsung Electronics Co., Ltd., Suwon-si, Gyeonggi-do (KR)

(72) Inventors: Chiwoo Lim, Suwon-si (KR); Kyungkyu Kim, Suwon-si (KR); Daegyun Kim, Seongnam-si (KR); Hyunseok Ryu, Yongin-si (KR); Seunghoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 14/075,643

(22) Filed: Nov. 8, 2013

(65) Prior Publication Data

US 2014/0128116 A1  May 8, 2014

(30) Foreign Application Priority Data

Nov. 8, 2012 (KR) .......................... 10-2012-0125868

(51) Int. Cl.
*H04W 72/00* (2009.01)
*H04W 72/04* (2009.01)
*H04W 72/02* (2009.01)

(52) U.S. Cl.
CPC ........ *H04W 72/0446* (2013.01); *H04W 72/02* (2013.01)

(58) Field of Classification Search
CPC ..... H04W 74/04; H04W 48/16; H04W 56/00; H04W 72/0406
USPC ..................................... 455/450, 451, 452.1
See application file for complete search history.

(56) References Cited

U.S. PATENT DOCUMENTS

| 8,005,091 | B2 | 8/2011 | Wu et al. |
| 2009/0016315 | A1 | 1/2009 | Laroia et al. |
| 2009/0019168 | A1 | 1/2009 | Wu et al. |
| 2012/0147745 | A1 | 6/2012 | Wang et al. |
| 2013/0064187 | A1* | 3/2013 | Patil et al. .................... 370/329 |

FOREIGN PATENT DOCUMENTS

| WO | 2008-147161 A1 | 12/2008 |
| WO | 2010-042340 A1 | 4/2010 |

* cited by examiner

*Primary Examiner* — Tu X Nguyen
(74) *Attorney, Agent, or Firm* — Jefferson IP Law, LLP

(57) ABSTRACT

A scheduling method and apparatus using a non-orthogonal Connection IDentifier (CID) for use in a device-to-device communication system is provided. The scheduling method includes generating a non-orthogonal CID for communication with a counterpart terminal, determining slot indices for communication using the non-orthogonal CID, and communicating with the counterpart terminal through the slots indicated by the slot indices. The non-orthogonal CID-based scheduling method and apparatus is capable of selecting the slots for use in the non-orthogonal CID-based scheduling according to a rule so as to overcome CID collision in the system of using the non-orthogonal CID.

12 Claims, 5 Drawing Sheets

FIG. 3

| Interval value | Priority | Congestion level |
|---|---|---|
| 1 | HIGH | LOW |
| 2 | INTERMEDIATE | LOW |
| 3 | LOW | LOW |
| 4 | HIGH | INTERMEDIATE |
| 5 | INTERMEDIATE | INTERMEDIATE |
| 6 | LOW | INTERMEDIATE |
| 7 | HIGH | HIGH |
| 8 | INTERMEDIATE | HIGH |
| 9 | LOW | HIGH |

NON-ORTHOGONAL CONNECTION ID-BASED SCHEDULING METHOD AND APPARATUS FOR USE IN DEVICE TO-DEVICE COMMUNICATION SYSTEM

CROSS-REFERENCE TO RELATED APPLICATION(S)

This application claims the benefit under 35 U.S.C. §119 (a) of a Korean patent application filed on Nov. 8, 2012 in the Korean Intellectual Property Office and assigned Serial No. 10-2012-0125868, the entire disclosure of which is hereby incorporated by reference.

TECHNICAL FIELD

The present disclosure relates to a device-to-device communication system. More particularly, the present disclosure relates to a scheduling method and apparatus using a non-orthogonal connection IDentifier (ID) for use in a device-to-device communication system.

BACKGROUND

With the technological advancement of communication devices, there are requirements for the services providing and sharing information the user wants. Recently, a smartphone and a tablet Personal Computer (PC) make it possible for the user to acquire and share various information through a wireless communication system.

However, in order for the user to acquire and share the information through a wireless communication system, there is a need for a communication infrastructure. In addition, the wireless communication system is not efficient to exchange trivial but useful information due to the system complexity and time delay.

Thus, a Device to Device (D2D) service has been introduced to make it possible for the devices to share device information to establish the communication link for a direct communication without a legacy communication infrastructure.

In the D2D environment, resource allocation is performed through a distributed scheduling which enables communication through a plurality of links tolerating interference on the same resource.

In order to implement the distributed scheduling without the assistance of a communication infrastructure or a controller, the device uses a Connection ID (CID) for each link. In the D2D service, the peer terminals generate a CID for the communication link in a pairing phase, the CID being limited in number, and join the scheduling in the actual traffic duration.

More specifically, in order to increase the resource reuse factor in consideration of the interference situation, an orthogonal CID-based scheduling is used. Here, the orthogonal CID denotes the CID which is not shared among adjacent links, and each terminal broadcasts the CID in use in the pairing phase to prevent the same CID from being used by other adjacent terminals.

In a case of using the orthogonal CIDs that are limited in number, however, it is difficult to support a plurality of links and, if the orthogonal CID utilization rate is low after pairing, this causes resource utilization inefficiency. Therefore, there is a need for a non-orthogonal CID.

In a case of using the non-orthogonal CID, however, the same CID may be used redundantly, resulting in an increase of collision probability.

Therefore, a need exists for a non-orthogonal CID-based scheduling method and apparatus that is capable of improving scheduling efficiency in a D2D communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a non-orthogonal Connection ID (CID)-based scheduling method and apparatus that is capable of improving scheduling efficiency in a Device to Device (D2D) communication system.

Another aspect of the present disclosure is to provide a non-orthogonal CID-based scheduling method and apparatus that is capable of selecting a slot for scheduling with the non-orthogonal CID according to a rule, resulting in minimization of a CID collision probability.

Another aspect of the present disclosure is to provide a non-orthogonal CID-based scheduling method and apparatus that is capable of improving scheduling efficiency with the assistance of a communication infrastructure for the parameters used in selecting the slot participating in scheduling with the non-orthogonal CID.

In accordance with an aspect of the present disclosure, a scheduling method of a terminal in a wireless communication system supporting a D2D communication is provided. The scheduling method includes generating a non-orthogonal CID for communication with a counterpart terminal, determining slot indices for communication using the non-orthogonal CID, and communicating with the counterpart terminal through slots indicated by the slot indices.

In accordance with another aspect of the present disclosure, a terminal for performing scheduling in a wireless communication system supporting a D2D communication is provided. The terminal includes a radio communication unit configured to transmit and receive signals to and from a counterpart terminal and a control unit configured to control generating a non-orthogonal CID for communication with a counterpart terminal, determining slot indices for communication using the non-orthogonal CID, and communicating with the counterpart terminal through slots indicated by the slot indices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram illustrating a table summarizing values of a parameter 'Interval' for use in a non-orthogonal CID-based scheduling method according to an embodiment of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
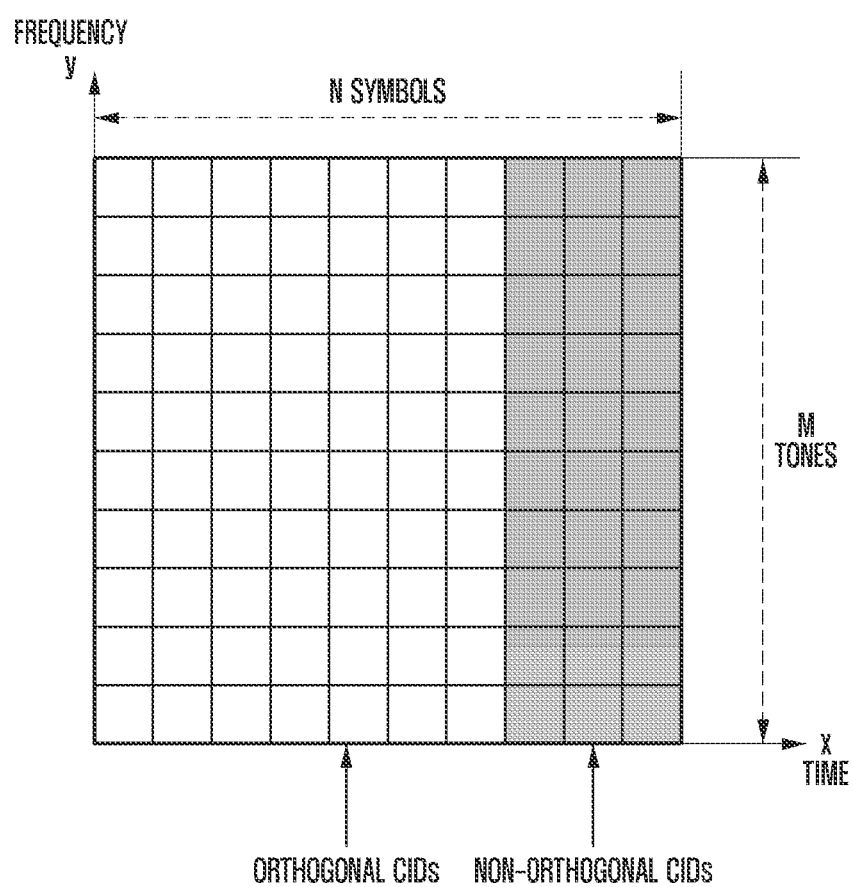
FIG. 1 is a diagram illustrating a resource grid for explaining the use of orthogonal and non-orthogonal Connection IDentifiers (CIDs) in a Device to Device (D2D) communication system according to an embodiment of the present disclosure.

FIG. 1 is a diagram illustrating a resource grid for explaining the use of orthogonal and non-orthogonal Connection IDentifiers (CIDs) in a Device to Device (D2D) communication system according to an embodiment of the present disclosure.

Referring to FIG. 1, the CIDs used in the D2D communication system are classified into an orthogonal CID set and a non-orthogonal CID set and the CIDs are paired through a pairing process. In the system of the related art, the non-orthogonal CID is changed randomly based on Tx-Rx pair, as time goes on, to prevent the same non-orthogonal CID from being used continuously.

However, as the number of pairs using the non-orthogonal CID increases, the issue is not properly addressed through this method. This means that it is difficult to overcome the CID collision issue with the temporal change of the non-orthogonal CID in the situation where a plurality of pairs exists.

This is because the CID (particularly, the non-orthogonal CID) changed by each pair randomly may be selected again and the pairs using different CIDs may select the same CID.

The present disclosure addresses the above-mentioned problem and relates to an apparatus and a method for supporting a D2D service. More particularly, the present disclosure relates to an apparatus and a method for facilitating scheduling in a system supporting a D2D communication service.

In the present disclosure, a pair of devices selects the slot for CID-based scheduling according to a rule unlike the method of the related art which changes CID randomly as time goes on.

Various embodiments of the present disclosure are described below with reference to the accompanying drawings.

Figure 2:
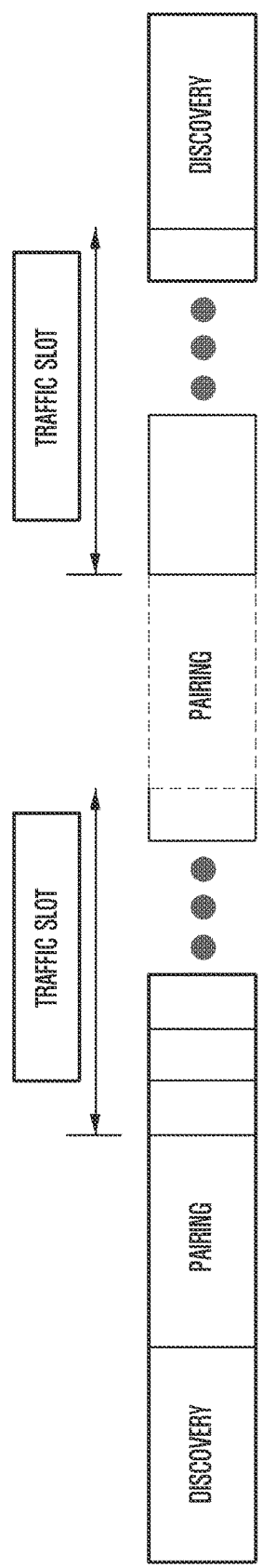
FIG. 2 is a diagram illustrating a frame structure for use in a D2D communication system according to an embodiment of the present disclosure.

FIG. 2 is a diagram illustrating a frame structure for use in a D2D communication system according to an embodiment of the present disclosure.

Referring to FIG. 2, after acquiring synchronization among different terminals, each terminal searches for the neighbor devices in the discovery duration. When participating in scheduling for a D2D connection or data communication, the corresponding terminal generates a CID.

At this time, the CID generated by each terminal is classified into one of an orthogonal CID and a non-orthogonal CID. Each terminal performs scheduling in the traffic slot using the CID generated in the pairing process.

The present disclosure proposes a method for minimizing CID collision, in the situation where the terminal generates a non-orthogonal CID in a pairing process, by selecting the slot for scheduling according to a rule.

According to an embodiment of the present disclosure, each pair of devices performs the following procedure for determining the slots for use in the non-orthogonal CID.

In the following, the term 'pair number' denotes the initial value of the slot which the corresponding pair is capable of participating in scheduling with a certain non-orthogonal CID among total traffic slots or offset value, which is calculated using Equation (1).

$$\text{Pair number(slot offset)} = (Tx\ ID + Rx\ ID)\ \%\ \text{total number of SLOTs (or an entire interval value)} \quad \text{Equation (1)}$$

In Equation (1), the Tx ID of the sender terminal and the Rx ID of the receiver terminal are used simultaneously or selectively. For example, one of Tx ID+Rx ID, Tx ID, and Rx ID can be used. If necessary, it is possible to select a value randomly. However, the value has to be known to both of the paired terminals. A modulo operation (%) may be performed with a total number of slots or an entire interval value.

If the pair number is determined, the pair calculates the index of the slot for scheduling. In this case, the slot index for participating in the non-orthogonal CID-based scheduling may be calculated using Equation (2).

$$\text{Usable slot index}(i) = (\text{Pair Number} + i*\text{Interval})\ \%\ \text{total number of slots} \quad \text{Equation (2)}$$

In Equation (2), 'I' denotes a running index having a value starting from 0 and incrementing by 1 until it becomes equal to the modulo operation result. 'Interval' is determined depending on the priority of the data to be transmitted by the pair, and the entire network congestion condition may be considered.

The priority of the data may denote a normal Quality of Service (QoS) level or a new level of the service defined in the D2D communication.

The network congestion condition may be determined based on the level detected by the Tx-Rx pair or indicated through a communication infrastructure. The communication infrastructure may denote the base station providing the terminal with the mobile communication service. The values available for 'Interval' are summarized in FIG. 3.

FIG. 3 is a diagram illustrating a table summarizing values of a parameter 'Interval' for use in a non-orthogonal CID-based scheduling method according to an embodiment of the present disclosure.

Referring to FIG. 3, the interval value available for calculating the index of the slot for use in the non-orthogonal CID may be determined based on the data priority and network congestion condition.

For example, if the data priority for transmission is 'high' and if the current network congestion condition is 'low', the interval value is set to 1 so as to use the non-orthogonal CID in more slots.

In contrast, if the data priority for transmission is 'low' and if the current network congestion condition is 'high', the interval is set to 9 to minimize the number of slots in which the non-CID can be used.

A description is made of the non-orthogonal CID utilization method according to an embodiment of the present disclosure hereinafter.

Suppose the total number of traffic slots is 100, the Tx ID and Rx ID of the pair having a non-orthogonal CID 3 is 15 and 6, respectively, and the interval value is selected in the range from 1 to 10.

According to an embodiment of the present disclosure, the slot for the pair to perform scheduling with the non-orthogonal CID for D2D data communication is determined as follows.

Each pair calculates the pair number using Equation (1). Equation (1) results in (15+6)%100 and, as a consequence, the pair number is 21.

Each pair determines the interval value and, in this embodiment of the present disclosure, it is assumed that the interval value is 4.

Thereafter, each pair determines the index of the slot capable of using the non-orthogonal CID using Equation (2) based on the pair number and the interval value, resulting in slot index(i)=(21+i*4) %100.

Accordingly, the traffic slots in which the pair is capable of scheduling with the non-orthogonal CID include 21, 25, 29, 31, . . . , 97, 1, 5, 9, 13, and 17.

In an embodiment of the present disclosure, each pair may determine the congestion level used for determining the interval value in the discovery duration or pairing duration.

However, the present disclosure is not limited to this method but may be embodied in such a way of indicating through the communication infrastructure. It is possible to use the reference signal of the communication infrastructure for an initial synchronization for D2D communication and, in this case, the congestion level of the current adjacent D2D communication situation may be indicated by the reference signal.

Figure 4:
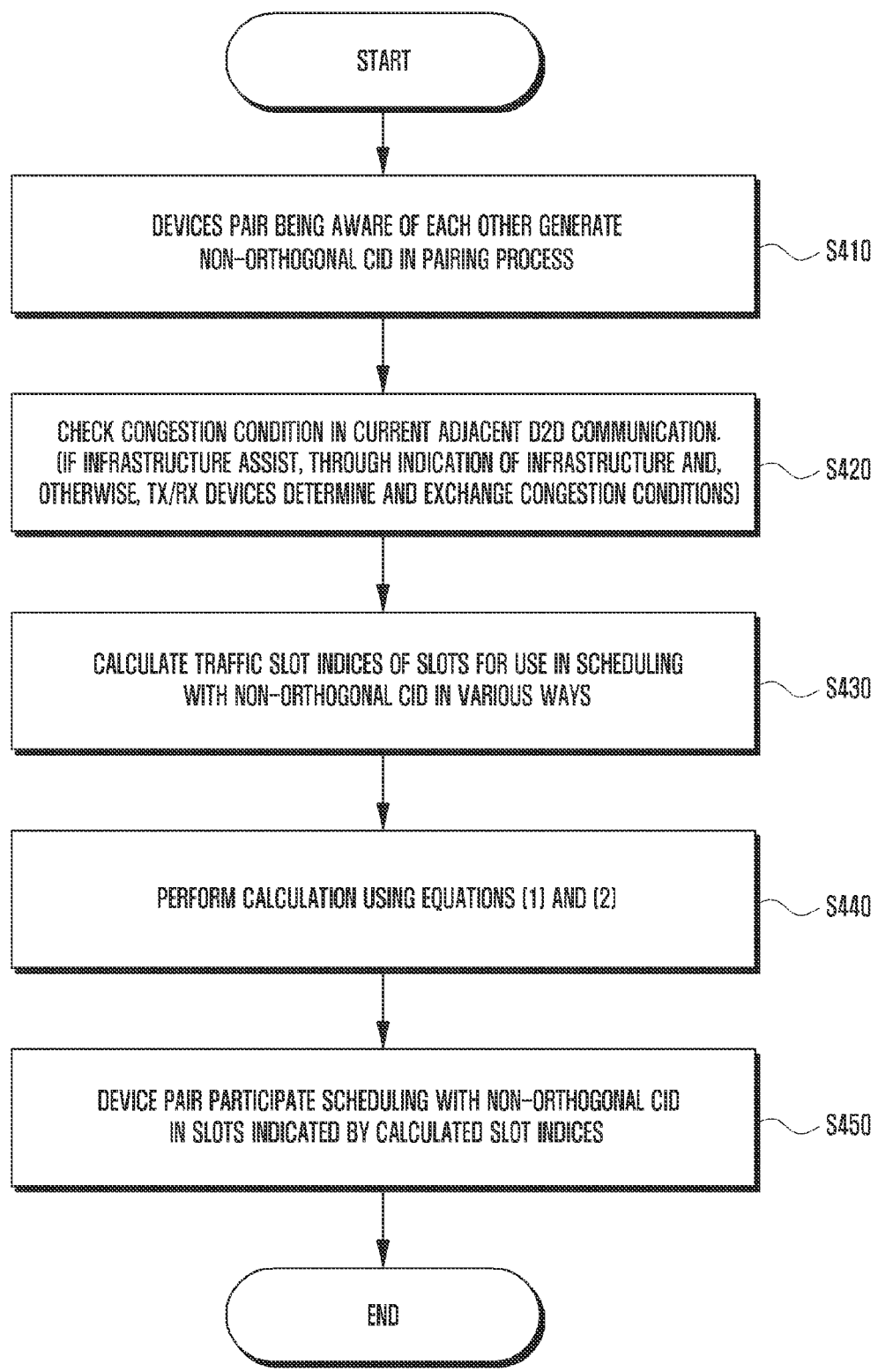
FIG. 4 is a flowchart illustrating a non-orthogonal CID-based scheduling method in a D2D communication system according to an embodiment of the present disclosure.

FIG. 4 is a flowchart illustrating a non-orthogonal CID-based scheduling method in a D2D communication system according to an embodiment of the present disclosure.

Referring to FIG. 4, a terminal checks with a counterpart terminal for communication through the discovery process at operation S410. In this case, the two peer terminals perform pairing to establish a connection for data communication. The pair generates a non-orthogonal CID in the pairing process.

The terminal checks the congestion condition for D2D communication at operation S420. At this time, the terminal determines the congestion level by itself or receives the congestion level information through the communication infrastructure.

The terminal calculates the indices of the traffic slots for scheduling with a non-orthogonal CID at operation S430. In an embodiment of the present disclosure, the terminal may calculate the indices of the traffic slots for use in the non-orthogonal CID using Equation (1) and Equation (2) at operation S440.

More specifically, the terminal determines the pair number based on the sender and receiver terminal identifiers and the total number of slots. The terminal also determined the indices of the traffic slots for use in the non-orthogonal CIDs based on the pair number, interval value, and total number of slots.

Once the traffic slot indices are determined, the terminal participates in scheduling with the non-orthogonal CID in the traffic slots indicated by the indices at operation S450.

Figure 5:
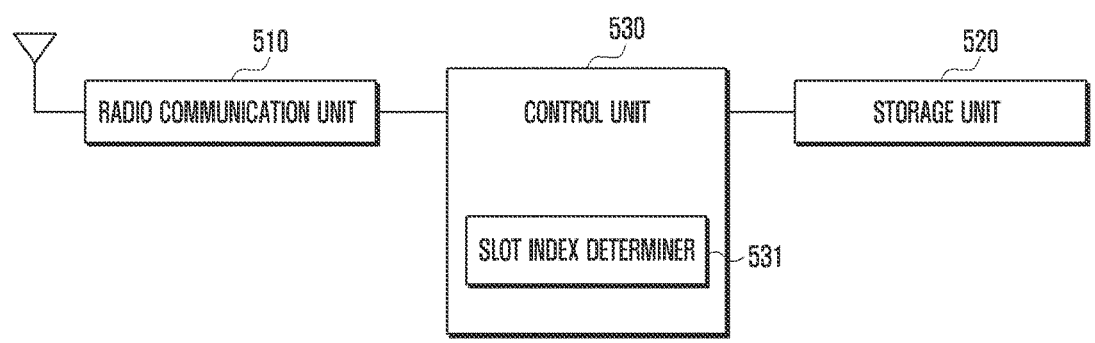
FIG. 5 is a block diagram illustrating a configuration of a terminal according to an embodiment of the present disclosure.

FIG. 5 is a block diagram illustrating a configuration of a terminal according to an embodiment of the present disclosure.

Referring to FIG. 5, the terminal includes a radio communication unit 510, a storage unit 520, and a control unit 530.

The radio communication unit 510 is responsible for radio communication for transmitting/receiving data. The radio communication unit 510 may include a Radio Frequency (RF) transmitter for up-converting and amplifying the transmission signal and an RF receiver for low noise amplifying and down-converting the received signal. The radio communication unit 510 receives data through a radio channel and sends the received signal to the control unit 530 and transmits the data output from the control unit 530 through the radio channel.

The storage unit 520 is responsible for storing programs and data used for the operation of the terminal According to an embodiment of the present disclosure, the storage unit 520 may store the program for calculating the indices of the slots for scheduling with a non-orthogonal CID.

The control unit 530 controls the overall operations of the terminal and the signal flows among the internal function blocks of the terminal. The control unit 531 may include a slot index determiner 531.

The slot index determiner 531 calculates the indices of the traffic slots for use in a non-orthogonal CID-based scheduling. More specifically, the slot index determiner 531 determines the pair number based on the sender and receiver terminal identifiers and the total number of slots. The slot index determiner 531 determines the indices of the traffic slots for use in the non-orthogonal CID. In this case, the slot index determiner 531, may perform the above procedure using Equation (1) and Equation (2).

Although the description is directed to a case where the slot index determiner 531 is formed as a function block separated from the control unit 530 for simplifying the explanation, it is not limited thereto. For example, the function of the slot index determiner 531 may be performed by the control unit 530.

As described above, the non-orthogonal CID-based scheduling method and apparatus of the present disclosure is capable of selecting the slots for use in the non-orthogonal CID-based scheduling according to a rule so as to overcome CID collision in the system of using the non-orthogonal CID.

In addition, the non-orthogonal CID-based scheduling method and apparatus of the present disclosure is capable of allowing the communication infrastructure to support the parameters used in selecting the slots for use in the non-orthogonal CID-based scheduling, resulting in an improvement in scheduling efficiency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A scheduling method of a terminal in a wireless communication system supporting a device-to-device communication, the method comprising:
    generating a non-orthogonal connection identifier (CID) for communication with a counterpart terminal;
    determining a pair number, which is an initial value of a slot that is available for scheduling using the non-orthogonal CID, according to a value acquired through a modulo operation with a total number of slots, to transmission and reception terminal identifiers;
    determining slot indices for communication using the non-orthogonal CID according to a value acquired through the modulo operation with the total number of slots, to sum of the determined pair number of an interval value, the interval value being an integer; and
    communicating with the counterpart terminal through slots indicated by the slot indices.

2. The method of claim 1, wherein the determining of the pair number further comprises using the following Equation:

pair number(slot offset)=($Tx\ ID+Rx\ ID$) % total number of SLOTs (or an entire interval value),
and wherein Tx ID is the transmission terminal identifier, Rx ID is the reception terminal identifier, and % is a modulo operation.

3. The method of claim 1, wherein the determining of the slot indices for communication using the non-orthogonal CID further comprises using the following Equation:

usable slot index($i$)=(Pair Number+$i$*Interval) % total number of slots, and wherein 'i' denotes a running index having a value starting from 0 and incrementing by 1 until it becomes equal to the modulo operation result.

4. The method of claim 1, wherein the transmission and reception terminal identifiers comprise at least one of a transmission terminal identifier and a reception terminal identifier.

5. The method of claim 1, wherein the interval value is determined based on at least one of a data priority and a congestion level.

6. The method of claim 5, wherein the congestion level is a value determined by the terminal or received through a communication infrastructure.

7. A terminal for performing scheduling in a wireless communication system supporting a device-to-device communication, the terminal comprising:
    a radio communication unit configured to transmit and receive signals to and from a counterpart terminal; and
    a control unit configured to:
        control generating a non-orthogonal connection identifier (CID) for communication with the counterpart terminal,
        determine a pair number, which is an initial value of a slot that is available for scheduling using the non-orthogonal CID, according to a value acquired through a modulo operation with a total number of slots, to transmission and reception terminal identifiers,
        determine slot indices for communication using the non-orthogonal CID according to a value acquired through the modulo operation with the total number of slots, to sum of the determined pair number of an interval value, the interval value being an integer, and
        communicate with the counterpart terminal through slots indicated by the slot indices.

8. The terminal of claim 7, wherein the control unit is further configured to determine the pair number using the following equation:

pair number(slot offset)=($Tx\ ID+Rx\ ID$) % total number of SLOTs (or an entire interval value),
and wherein Tx ID is the transmission terminal identifier, Rx ID is the reception terminal identifier, and % is a modulo operation.

9. The terminal of claim 7, wherein the control unit is further configured to determine the indices of the slots for communication using the non-orthogonal CID using the following equation:

usable slot index($i$)=(Pair Number+$i$*Interval) % total number of slots, and wherein 'I' denotes a running index having a value starting from 0 and incrementing by 1 until it becomes equal to the modulo operation result.

10. The terminal of claim 7, wherein the transmission and reception terminal identifiers comprise at least one of a transmission terminal identifier and a reception terminal identifier.

11. The terminal of claim 7, wherein the interval value is determined based on at least one of a data priority and a congestion level.

12. The terminal of claim 11, wherein the congestion level is a value determined by the terminal or received through a communication infrastructure.

* * * * *